(12) United States Patent
Walzer, Jr. et al.

(10) Patent No.: US 6,426,313 B2
(45) Date of Patent: *Jul. 30, 2002

(54) POLYMERIC SUPPORTED CATALYSTS FOR OLEFIN POLYMERIZATION

(75) Inventors: John F. Walzer, Jr., Seabrook; Anthony J. Dias, Houston, both of TX (US); Jean M J Frechet, Oakland, CA (US); Stephen B. Roscoe, St. Paul, MN (US)

(73) Assignee: Exxon Mobil Chemical Patents Inc., Houston, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/277,339

(22) Filed: Mar. 26, 1999

Related U.S. Application Data

(60) Provisional application No. 60/048,965, filed on Jun. 5, 1997, and provisional application No. 60/079,563, filed on Mar. 27, 1998.

(51) Int. Cl.$^7$ .......................... B01J 31/00; B01J 37/00; C08F 4/02; C08F 4/60; C08F 4/44
(52) U.S. Cl. ...................... 502/103; 502/117; 502/152; 502/155; 502/159; 526/131; 526/160; 526/163
(58) Field of Search ................................ 502/103, 117, 502/152, 155, 159; 526/131, 160, 163, 943

(56) References Cited

U.S. PATENT DOCUMENTS

| | | | |
|---|---|---|---|
| 4,246,134 A | 1/1981 | Uvarov et al. ............... | 252/429 |
| 4,463,135 A | 7/1984 | Maly ........................... | 525/123 |
| 5,198,401 A | 3/1993 | Turner et al. ................ | 502/155 |
| 5,427,991 A | 6/1995 | Turner ......................... | 502/103 |
| 5,610,115 A | 3/1997 | Soga et al. .................. | 502/152 |
| 5,939,347 A * | 8/1999 | Ward et al. .................. | 502/104 |
| 6,100,214 A * | 8/2000 | Walzer, Jr. et al. .......... | 502/159 |

FOREIGN PATENT DOCUMENTS

| | | |
|---|---|---|
| EP | 0 710 663 A1 | 5/1996 |
| WO | WO 88/01164 | 2/1988 |
| WO | WO 93/11172 a | 6/1993 |
| WO | WO 96/35726 | 11/1996 |
| WO | WO 96/40796 | 12/1996 |

OTHER PUBLICATIONS

"Functionalization Of Crosslinked Polystrene Resins By Chemical Modification, A Review" Frechet, J.M.J., et al, Chemistry and Properties of Crosslinked Polymers, pp. 59–83, (1977) No Month.

"A New Polymer–Supported Catalysts For Olefin Polymerization," Sun L. Shariati, et al, Studies In Surface Science And Catalysis, vol. 89, pp. 81–89, (1994) No Month.

* cited by examiner

Primary Examiner—Elizabeth D. Wood
(74) Attorney, Agent, or Firm—William G. Muller; Charles Edwin Runyan, Jr.

(57) ABSTRACT

The described invention provides a low fouling, high particle density polymerization process and an olefin polymerization cocatalyst activator composition comprising a crosslinked polymer bead having a surface area of from about 1 to 20 m$^2$/g to which are bound a plurality of non-coordinating anions, where the polymeric support comprises ligands covalently bound to the central metal or metalloid atoms of said anions, and an effective number of cationic species to achieve a balanced charge. The invention also provides an olefin polymerization catalyst compositions comprising the reaction product of a) the foregoing cocatalyst activator, and b) an organometallic transition metal compound having ancillary ligands, at least one labile ligand capable of abstraction by protonation and at least one labile ligand into which an olefinic monomer can insert for polymerization. In a preferred embodiment, the polymeric support has a surface area of $\leq 10$ m$^2$/g and is particularly suitable for use with high activity organometallic, transition metal catalyst compounds.

8 Claims, No Drawings

POLYMERIC SUPPORTED CATALYSTS FOR OLEFIN POLYMERIZATION

RELATED APPLICATIONS

This application claims priority from earlier filed applications Ser. No. 60/048,965, filed Jun. 5, 1997, and Ser. No. 60/079,563, filed Mar. 27, 1998.

TECHNICAL FIELD

This invention relates to olefin polymerization with organometallic transition metal catalysts on polymeric supports wherein the transition metal catalysts are activated for polymerization by an ionizing reaction and stabilized in cationic form with a noncoordinating anion.

BACKGROUND ART

The use of ionic catalysts for olefin polymerization where organometallic transition metal cations are stabilized in an active polymerization state by compatible, non-coordinating anions is a well-recognized field in the chemical arts. Typically such organometallic transition metal cations are the chemical derivatives of organometallic transition metal compounds having both ancillary ligands which help stabilize the compound in an active electropositive state and labile ligands at least one of which can be abstracted to render the compound cationic and at least one of which is suitable for olefin insertion. Since inert supports are used industrially for insertion polymerization processes in both of gas phase polymerization and slurry polymerization, technology for supporting these ionic catalysts is also known.

U.S. Pat. No. 5,427,991 describes the chemical bonding of discrete non-coordinating anionic activators, such as described in the earlier U.S. Pat. No. 5,198,401, to supports so as to prepare polyanionic activators that when used with the metallocene compounds avoid problems of catalyst desorption experienced when ionic catalysts physically adsorbed on inert supports are utilized in solution or slurry polymerization. The supports are core components of inert monomeric, oligomeric, polymeric or metal oxide supports which have been prepared so as to incorporate chemically bound, discrete non-coordinating anions. The teaching of the preparation of polyanionic activators from hydrocarbyl compounds (FIGS. 1, 5–6) entails a number of reactions. A typical reaction for a polymeric core component is that of a treating with the lithiating agent n-BuLi, or optionally lithiating a polymerizable monomer followed by polymerization of monomers into a polymeric segment, to produce a polymer or cross-linked polymer having pendant hydrocarbyl lithium groups. These are subsequently treated with the bulky Lewis acid trisperfluorophenylboron (B(pfp)$_3$) and subjected to an ion exchange reaction with dimethylanilinium hydrochloride ([DMAH]$^+$[Cl]$^-$) so as to prepare a polymer surface having covalently linked activator groups of [DMAH]$^+$[(pfp)$_3$BP]$^-$, where P is the polymeric core component.

In addition to the attachment of anionic complexes to support substrates, patent literature describes the attachment of transition metal ligand groups to polymeric supports, the ligand groups then being reacted with transition metal compounds so as to form organometallic compounds bound through cyclopentadienyl ligands to polymeric supports. Such compounds can then be rendered suitable as olefin polymerization catalysts by the use of activating cocatalyst compounds, e.g., such as alkylalumoxanes and phenylborates. See U.S. Pat. Nos. 4,463,135, 5,610,115 and WO 96/35726. WO 96/35726 in particular notes the use of an acrylate-containing copolymer support having a surface area of less than about 15 m$^2$/g, with examples illustrating 2.1 m$^2$/g surface area. These catalysts are taught to be of benefit over metal oxide supports in requiring fewer preparation steps since polar moieties such as adsorbed water and hydroxyl groups are not typically present on the polymeric supports. However, this technology presents problems in that the preparation of the support bound ligands limits ligand selection available for subsequent bonding to the transition metal and gives rise to low reaction product yields and undesirable byproducts, some of which may either interfere or compete with subsequent reactions.

Also the functionalization of polymer resin beads for use with or preparation of heterogeneous catalytic species is known. See, e.g., Fréchet, J. M. J., Farrall, M. J., "Functionalization of Crosslinked Polystyrene by Chemical Modification", *Chemistry and Properties of Crosslinked Polymers*, 59–83 (Academic Press, 1977); and, Sun, L., Shariati, A., Hsu, J. C., Bacon, D. W., *Studies in Surface Science and Catalysis* 1994, 89, 81, and U.S. Pat. No. 4,246,134, this patent describing polymeric carriers of macroporous copolymers of vinyl and divinyl monomers with specific surface areas of 30 to 700 m$^2$/g. and the use of such for vinyl monomer polymerization.

The use of supported or heterogeneous catalysts in gas phase polymerization is important as a means of increasing process efficiencies by assuring that the forming polymeric particles achieve shape and density that improves reactor operability and ease of handling. Ineffective catalyst supports permit the production of polymeric fines and resulting fouling of reactor walls or piping. This appears to be due to a number of possible reasons, including premature support particle fragmentation due to excessively rapid polymerization of monomer or catalyst desorption both of which can lead to decrease in the control of polymerization. Polymer particle size and density can be degraded and efficiencies lost. Additionally, ionic catalysts based on discrete non-coordinating anions provide significant industrial advantages in reducing the amounts of cocatalyst needed and in often providing safer and cheaper synthesis of those cocatalyst activator compounds. These catalysts however can be highly sensitive to polar impurities and accordingly methods of catalyst synthesis that can reduce the production of potential interfering byproducts are desirable.

SUMMARY OF THE INVENTION

The invention provides a low fouling, high particle density polymerization process using a supported olefin polymerization cocatalyst activator composition comprising a cross-linked polymer bead having a surface area of from about 1 to 20 m$^2$/g to which are bound a plurality of non-coordinating anions, where the polymeric support comprises ligands covalently bound to the central metal or metalloid atoms of said anions, and an effective number of cationic species to achieve a balanced charge. The invention includes activated olefin polymerization catalysts derived as the reaction product of said cocatalyst activator composition and an organometallic transition metal compound having ancillary ligands, at least one labile ligand capable of abstraction by protonation by said cocatalyst activator composition and at least one labile ligand into which an olefinic monomer can insert for polymerization. In a preferred embodiment, the polymeric support has a surface area of $\leq 10$ m$^2$/g and is particularly suitable for use with high activity organometallic, transition metal catalyst compounds.

DESCRIPTION OF THE INVENTION

The olefin polymerization cocatalyst activator composition according to the invention is a stable polymeric supported activator that can be washed, stored, shipped or otherwise handled prior to introduction of the organometallic transition metal compounds without deleterious effects on its ability to activate by protonation those compounds and facilitate their placement throughout the polymeric, resin supports consisting of cross-linked polymer beads. It comprises a protonated salt functionality having a weakly coordinating anionic complex covalently bonded to the polymeric support, the salt functionality comprising a suitable cation, said polymeric support being substantially nonporous as reflected in its low surface area.

The invention polymeric, activator support can be represented by the formula A:

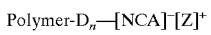

Polymer-$D_n$—[NCA]$^-$[Z]$^+$    A where "Polymer" is a cross-linked polymeric backbone, D is an optional group linking the Polymer to NCA, n is 0 or 1, NCA refers to a compatible "noncoordinating anion" derived from a Lewis acid moiety (as further defined below), and Z is a suitable cation that electronically charge balances NCA. The linking group is a substantially hydrocarbyl diradical (—D—) containing 1 to 30 carbon atoms, more preferably 1 to 20 carbon atoms. Also for the purposes of this application the term "substantially hydrocarbyl" includes radicals where up to 3 carbon atoms of —D— may be replaced by heteroatoms selected from the group consisting of N, O, S, P and Se, and one or more of the hydrogen radicals may be replaced by a halide radical. Additionally one or more of the carbon atoms may be replaced by the other Group 14 atoms Si, Ge and Sn.

Examples of suitable linking groups —D— are depicted in the chemical representations below, Ph represents phenyl.

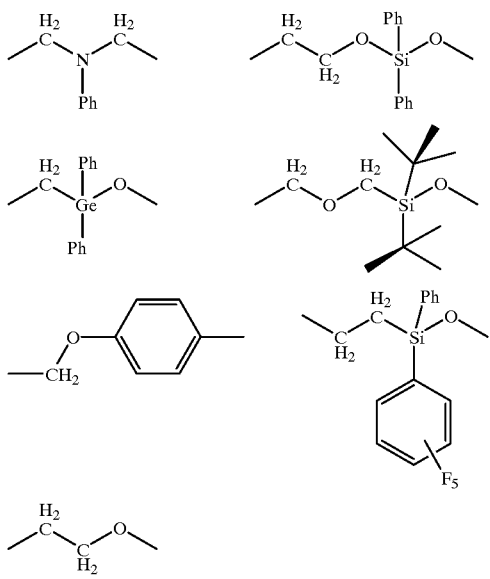

The polymeric support typically comprises an essentially hydrocarbon polymeric compound, preferably of sufficiently low surface area so as to avoid excessive monomer access to the active catalyst sites, which sites are distributed throughout the mass of the support by virtue of the incorporated functional groups on the polymeric chains making up the support. The term low surface area means a porosity of $\leq 20$ m$^2$/g, preferably $\leq 10$ m$^2$/g, as measured a single point nitrogen B.E.T. (Brunauer, S., Emmmet, P. H., Teller, E., JACS 1938, 60, 309) and is, for example, based upon the use of polystyrene based beads or gels. These beads or gels are lightly cross-linked and functionalized with noncoordinating anions. Important features of these catalyst support compounds is insolubility in the solvents used in preparing the supported catalysts or in its use in polymerizing monomers, the particle size as related to effectiveness for use in fluidized bed reactors, and overall resistance to fracture under temperature pressure and loading requirements. However the support is designed to be permeable to polymerizable monomers under gas phase or slurry polymerization. Thus the support must be insoluble under normal polymerization operating conditions. Preferably the beads are in the form of spheres of uniform dimension and having a normal size range between 400 and 100 US Mesh sizing (30 to 100 micrometers).

Suitable supports can be derived in the form of crosslinked polymers and are the most preferable for this invention. Suitable, optionally functionalized, essentially hydrocarbon polymeric supports or carriers can be obtained commercially, e.g., polystyrene beads or gels, or prepared synthetically in accordance with general knowledge in the art, see for example the Background art above. Polymers containing substantial oxygen content, particularly the acrylate copolymers such as disclosed in WO 96/35726, are unsuitable as polymeric supports given the oxophilic nature of the organometallic transition metal catalyst components described herein. Synthesis can be by copolymerization of vinyl monomers and subsequent chemical reaction derivation that places the appropriate functional groups on the hydrocarbon polymeric chains making up the supports. Specific exemplification is provided by polystyrene-divinylbenzene copolymer gels or beads. The relative strength, resistance to fracture, is provided by the weight % content of divinylbenzene (DVB) comonomer, commercially available products contain from 2 to 20 wt. % DVB. The higher ranges of DVB, e.g., 10 to 20 wt. %, provide additional strength but the resulting additional crosslinking hinders kinetics by making the bead resistant to the shrinking and swelling necessary to normal polymerization operations. The crosslinking may be designed with a gradient to control polymerization rates and mechanical properties of the polymeric support. The effective porosity is adjustable by selection of crosslink content. For example, DVB contents of 5 to 10 wt. % can yield restricted polymerization kinetics suitable for high activity polymerization catalysis, DVB contents of 1 to 5 wt. % can provide less restricted polymerization kinetics suitable for lower activity polymerization catalysis. The term "high activity" relates to catalyst systems capable of activities greater than about 1×10$^7$ g-polymer/mol.-transition metal compound-atm-hr and "low activity" can be understood as below about that amount. Additionally, polymeric supports with higher levels of cross-linking will be less permeable to polymerizable monomers.

Thus the compounds A can be prepared from preformed crosslinked polymer beads which can be purchased or prepared by emulsion polymerization of suitable monomers, for example vinyl monomers, e.g., styrene, and a crosslinking comonomer, such as divinyl benzene. Other suitable vinyl monomers include alkyl substituted styrene (para-methylstyrene, alpha-methylstyrene, meta-t-butylstyrene); halogenated styrenes (p-bromostyrene, m-bromostyrene, chloromethylstyrene, 4-bromo-2,3,5,6-tetrafluorostyrene, 3,5-trifluoromethylstyrene); trialkylstannyl-styrenes (p-trimethylstannylstyrene); butadiene, cyclic dihydrocarbylsiloxanes (hexamethylcyclotrisiloxane, hexaphenylcyclotrisiloxane, decamethylcyclopentasiloxane, hexa(4-bromo-2,3,5,6-tetrafluorophenyl)cyclotrisiloxane); butadiene, acrylonitrile, ethylene, and propylene. Typically the crosslinked polymeric beads are lithiated so as to form benzyllithium anion structures located throughout the polymeric matrix. Stable anionic coordination complexes can then be prepared by reaction with the Lewis acidic, halogenated trisaryl Group 13 metal or metalloid compounds, e.g., tris(pentafluorophenyl)boron or aluminum. See the following examples and FIG. 5 of U.S. Pat. No. 5,427,991.

Alternatively, the functionalized, crosslinked polymeric beads can be produced by emulsion copolymerization of a monomer which is itself a stable anionic coordination complex and a cross-linkable comonomer. An example of a stable coordination complex, i.e., an anionic activator moiety, capable of emulsion copolymerization is (N,N-dimethylanilinium 1-vinyl-2,3,5,6-tetrafluorophenyltris-(perfluorophenyl)borate). For this monomer, N,N-dimethylanilinium is Z, 1-vinyl-2,3,5,6-tetrafluorophenyl provides —D—, and tetrafluorophenyltris(perfluorophenyl)borate) provides NCA, the elements of formula A above.

The term noncoordinating anion as used for the invention compounds is art recognized to mean an anion which either does not coordinate to a suitable organometallic transition metal cation or which is only weakly coordinated to said cation thereby remaining sufficiently labile to be displaced by a neutral Lewis base. "Compatible" noncoordinating anions are those which are not degraded to neutrality when the complexes between them and the transition metal cationic catalyst compounds are formed. Further, the anion will not transfer an anionic substituent or fragment to the cation so as to cause it to form a neutral four coordinate metal compound and a neutral by-product from the anion. Noncoordinating anions useful in accordance with this invention are those which are compatible, stabilize the invention transition metal cation in the sense of balancing its ionic charge, yet retain sufficient lability to permit displacement by an olefinically unsaturated monomer during polymerization. Additionally, the anions useful in this invention will be of sufficient molecular size to partially inhibit or help to prevent neutralization of the invention transition-metal cation by Lewis bases other than the polymerizable monomers that may be present in the polymerization process. Suitable discrete noncoordinating anions are described in U.S. Pat. Nos. 5,198,401, 5,278,119, 5,407,884 or in EP 0 426 637. All documents are incorporated by reference for purposes of U.S. patent practice.

The Lewis acidic, halogenated trisaryl Group 13 metal or metalloid compounds that can act suitably as noncoordinating anions when covalently bonded to the polymeric support of this invention are strong Lewis acids (LA) with non-hydrolyzable ligands, at least one of which is electron-withdrawing, such as those Lewis acids known to abstract an anionic fragment from dimethyl zirconocene (biscyclopentedienyl zirconium dimethyl) e.g., trisperfluorophenyl boron. For example, any Group 13 element based Lewis acids having only alkyl, halo, alkoxy, and/or amido ligands, which are readily hydrolyzed in aqueous media, are not suitable. At least one ligand of the Lewis acids of the invention must be sufficiently electron-withdrawing to achieve the needed acidity, for example, as with trisperfluorophenyl boron. Typical metal/metalloid centers for LA will include boron, aluminum, antimony, arsenic, phosphorous and gallium.

Most preferably LA is a neutral compound comprising a Group 13 metalloid center with a complement of ligands together sufficiently electron-withdrawing such that the Lewis acidity is greater than or equal to that of $AlCl_3$. Examples include trisperfluorophenylboron, tris(3,5-di(trifluoromethyl)phenyl) boron, tris(di-t-butylmethylsilyl) perfluorophenylboron, and other highly fluorinated trisarylboron compounds. See additionally the description of suitable ligands for the single boron compounds of U.S. Pat. No. 5,198,401, e.g., in columns 10–11. See also the description in U.S. Pat. No. 5,296,433 of Lewis acid compounds comprising tris(pentafluorophenyl)borane and specific complexing compounds and the description in WO 97/29845 of the organo-Lewis acid perfluorobiphenylborane. All documents are incorporated by reference for purposes of U.S. patent practice. Halogenated aromatic radicals are preferred so as to allow for increased charge dispersion decreasing the likelihood of boron-ligand abstraction by the strongly Lewis acidic metallocene cation formed in the catalytic activation of the metallocene compound by protonation. Thus it is preferred that there be at least three halogen atoms replacing hydrogen atoms on each of the aryl radicals, more preferred that the aryl ligands be perhalogenated. Fluorine in the most preferred halogen and perfluorinated compounds are most preferred.

Typically suitable cations (Z) that charge balance said Lewis acid derived, polymer bonded NCA can be derived from cation precursor salts capable of an ion exchange reaction with the functionalized polymer beads (or the functionalized, emulsion-polymerizable monomers), and capable of consequent electronic stabilization of the noncoordinating anionic complex. Such include trialkyl-substituted ammonium salts such as triethylammonium hydrochloride, tripropylammonium hydrochloride, tri(n-butyl)ammonium hydrochloride, trimethylammonium hydrochloride, tributylammonium hydrochloride and the like; N,N-dialkyl anilinium salts such as N,N-dimethylanilinium hydrochloride, N,N-2,4,6-pentamethylanilinium hydrochloride, N,N-methylethyl anilinium hydrochloride and the like; and dialkyl ammonium salts such as di-(isopropyl)ammonium hydrochloride, dicyclohexylammonium hydrochloride, di-n-butylmethylammonium hydrochloride, and the like. Further examples of suitable ionic precursors include those comprising a stable carbonium or silylium ion, and a compatible anion. These include tropillium chloride, triphenylmethylium chloride, and benzene (diazonium) chloride.

The invention olefin polymerization catalyst composition is the product of the reaction achieved by contacting A with an organometallic transition metal compound that is suitable for olefin polymerization when activated by protonation with the polymeric supported activator of the invention. This product is a supported ionic catalyst composition having an organometallic transition metal cation and the complementary noncoordinating anion, this composition being dispersed in the polymeric support matrix.

The contacting should be conducted so as to permit permeation of the organometallic transition metal compound into the matrix of the polymeric support and thus is preferably conducted by treating the supported activator particles with a solution of the organometallic transition metal compound. Suitable solvents for the organometallic transition metal compounds may be aliphatic or aromatic, depending upon the ligation, the chemical composition of the support material, and the degree of crosslinking of the support. Toluene and hexane are typical. It is particularly desirable to use a solvent to swell the microporous support. The temperature and pressure of the contacting can vary so long as the reactants, solvents and the carrier are neither degraded nor rendered unreactive. Ambient conditions are suitable. The resulting activation by protonation and stabilization with the polymer bound noncoordinating anion is well known, by analogy, for organometallic transition metal compounds suitable for olefin polymerization, see for example, U.S. Pat. Nos. 5,198,401, 5,278,119 and WO 96/04319 for descriptions of the mechanisms involved. All documents are incorporated by reference for purposes of U.S. patent practice.

Organometallic transition metal compounds suitable as olefin polymerization catalysts by coordination or insertion polymerization in accordance with the invention will include the known transition metal compounds useful in traditional Ziegler-Natta coordination polymerization and as well the metallocene compounds similarly known to be useful in coordination polymerization, when such compounds are capable of catalytic activation by the cocatalyst activators described for the invention. These will typically include Group 4–10 transition metal compounds where the metal is in a d0 oxidation state, that is where the metal has its highest oxidation number, and wherein at least one metal ligand can be abstracted by the cocatalyst activators, particularly those ligands including hydride, alkyl and silyl. Ligands capable of abstraction and transition metal compounds comprising them include those described in the background art see for example U.S. Pat. Nos. 5,198,401 and 5,278,119. Syntheses of these compounds is well known from the published literature. Additionally, where the metal ligands include halogen, amido or alkoxy moieties (for example, biscyclopentadienyl zirconium dichloride) which are not capable of abstraction with the activating cocatalysts of the invention, they can be converted via known alkylation reactions with organometallic compounds such as lithium or aluminum hydrides or alkyls, alkylalumoxanes, Grignard reagents, etc. See also EP-A1-0 570 982 for the reaction of organoaluminum compounds with dihalo-substituted metallocene compounds prior to addition of activating anion compounds. All documents are incorporated by reference for purposes of U.S. patent practice.

Additional description of metallocene compounds which comprise, or can be alkylated to comprise, at least one ligand capable of abstraction to form a catalytically active transition metal cation appear in the patent literature, for example EP-A-0 129 368, U.S. Pat. Nos. 4,871,705, 4,937,299, 5,324,800 EP-A-0 418 044, EP-A-0 591 756, WO-A-92/00333 and WO-A-94/01471. Such metallocene compounds can be described for this invention as mono- or biscyclopentadienyl substituted Group 4, 5, 6, 9, or 10 transition metal compounds wherein the ancillary ligands may be themselves substituted with one or more groups and may be bridged to each other, or may be bridged through a heteroatom to the transition metal. The size and constituency of the ancillary ligands and bridging elements are not critical to the preparation of the ionic catalyst systems of the invention but should be selected in the literature described manner to enhance the polymerization activity and polymer characteristics being sought. Preferably the cyclopentadienyl rings (including substituted cyclopentadienyl-based fused ring systems, such as indenyl, fluorenyl, azulenyl, or substituted analogs of them), when bridged to each other, will be lower alkyl-substituted ($C_1$–$C_6$) in the 2 position (without or without a similar 4-position substituent in the fused ring systems) and may additionally comprise alkyl, cycloalkyl, aryl, alkylaryl and or arylalkyl substituents, the latter as linear, branched or cyclic structures including multi-ring structures, for example, those of U.S. Pat. Nos. 5,278,264 and 5,304,614. Such substituents should each have essentially hydrocarbyl characteristics and will typically contain up to 30 carbon atoms but may be hetero-atom containing with 1–5 non-hydrogen/carbon atoms, e.g., N, S, O, P, Ge, B and Si. All documents are incorporated by reference for purposes of U.S. patent practice.

Metallocene compounds suitable for the preparation of linear polyethylene or ethylene-containing copolymers (where copolymer means comprising at least two different monomers) are essentially any of those known in the art, see again EP-A-277,004, WO-A-92/00333 and U.S. Pat. Nos. 5,001,205, 5,198,401, 5,324,800, 5,308,816, and 5,304,614 for specific listings. Selection of metallocene compounds for use to make isotactic or syndiotactic polypropylene, and their syntheses, are well-known in the art, specific reference may be made to both patent literature and academic, see for example Journal of Organmetallic Chemistry 369, 359–370 (1989). Typically those catalysts are stereorigid asymmetric, chiral or bridged chiral metallocenes. See, for example, U.S. Pat. Nos. 4,892,851, 5,017,714, 5,296,434, 5,278,264, WO-A-(PCT/US92/10066) WO-A-93/19103, EP-A2-0 577 581, EP-A1-0 578 838, and academic literature "The Influence of Aromatic Substituents on the Polymerization Behavior of Bridged Zirconocene Catalysts", Spaleck, W., et al, Organometallics 1994, 13, 954–963, and "ansa-Zirconocene Polymerization Catalysts with Annelated Ring Ligands-Effects on Catalytic Activity and Polymer Chain Lengths", Brinzinger, H., et al, Organometallics 1994, 13, 964–970, and documents referred to therein. Though many above are directed to catalyst systems with alumoxane activators, the analogous metallocene compounds will be useful with the cocatalyst activators of this invention for active coordination catalyst systems, when the halogen, amide or alkoxy containing ligands of the metals (where occurring) are replaced with ligands capable of abstraction, for example, via an alkylation reaction as described above, and another is a group into which the ethylene group —C=C— may insert, for example, hydride, alkyl, or silyl. All documents are incorporated by reference for purposes of U.S. patent practice.

Non-limiting representative metallocene compounds include mono-cyclopentadienyl compounds such as pentamethylcyclopentadienyltitanium isopropoxide, pentamethylcyclopentadienyltribenzyl titanium, dimethylsilyltetramethylcyclopentadienyl-tert-butylamido titanium dichloride, pentamethylcyclopentadienyl titanium trimethyl, dimethylsilyltetramethylcyclopentadienyl-tert-butylamido zirconium dimethyl, dimethylsilyltetramethylcyclopentadienyl-dodecylamido hafnium dihydride, dimethylsilyltetramethylcyclopentadienyl-dodecylamido hafnium dimethyl, unbridged biscyclopentadienyl compounds such as bis(1,3-butyl, methylcyclopentadienyl) zirconium dimethyl, pentamethylcyclopentadienyl-cyclopentadienyl zirconium dimethyl; bridged biscyclopentadienyl compounds such as dimethylsilylbis (tetrahydroindenyl) zirconium dichloride; bridged bisindenyl compounds such as dimethylsilylbisindenyl zirconium dichloride, dimethylsilylbisindenyl hafnium dimethyl, dimethylsilylbis(2-methylbenzindenyl) zirconium dichloride, dimethylsilylbis(2-methylbenzindenyl) zirconium dimethyl; and the additional mono- and biscyclopentadienyl compounds such as those listed and described in U.S. Pat. Nos. 5,017,714, 5,324,800 and EP-A-0 591 756. All documents are incorporated by reference for purposes of U.S. patent practice.

Representative traditional Ziegler-Natta transition metal compounds include tetrabenzyl zirconium, tetra bis (trimethylsiylmethyl) zirconium, oxotris (trimethlsilylmethyl) vanadium, tetrabenzyl hafnium, tetrabenzyl titanium, bis(hexamethyl disilazido)dimethyl titanium, tris(trimethyl silyl methyl) niobium dichloride, tris(trimethylsilylmethyl) tantalum dichloride. The important features of such compositions for coordination polymerization are the ligand capable of abstraction by protonation and that ligand into which the ethylene (olefinic) group can be inserted. These features enable the abstraction of the transition metal compound and the concomitant formation of the ionic catalyst composition of the invention.

Additional organometallic transition metal compounds suitable as olefin polymerization catalysts in accordance with the invention will be any of those Group 4–10 that can be converted by ligand abstraction into a catalytically active cation and stabilized in that active electronic state by a noncoordinating or weakly coordinating anion sufficiently labile to be displaced by an olefinically unsaturated monomer such as ethylene. Exemplary compounds include those described in the patent literature. U.S. Pat. No. 5,318,935 describes bridged and unbridged bisamido transition metal catalyst compounds of Group 4 metals capable of insertion polymerization of α-olefins. International patent publications WO 96/23010 and WO 97/48735 describe diimine nickel and palladium compounds suitable for ionic activation and olefin polymerization. Transition metal polymerization catalyst systems from Group 5–10 metals wherein the active transition metal center is in a high oxidation state and stabilized by low coordination number polyanionic ancillary ligand systems are described in U.S. Pat. No. 5,502,124 and its divisional U.S. Pat. No. 5,504,049. Bridged bis(arylamido) Group 4 compounds for olefin polymerization are described by D. H. McConville, et al, in *Organometallics* 1995, 14, 5478–5480. Synthesis methods and compound characterization are presented. Further work appearing in D. H. McConville, et al, *Macromolecules* 1996, 29, 5241–5243, described the bridged bis(arylamido) Group 4 compounds are active catalysts for polymerization of 1-hexene. Additional transition metal compounds suitable in accordance with the invention include those described in co-pending U.S. patent applications Ser. No. 08/803,687 filed Feb. 24, 1997 and published as WO 98/37109, Ser. No. 08/999,214 filed Dec. 29, 1997 and published as WO 98/37106, Ser. No. 09/042,378, filed Mar. 13, 1998 and published as WO 98/41530, Ser. No. 08/473,693 filed Jun. 7, 1995 and published as WO 96/40805 and U.S. Pat. No. 5,851,945. Each of these documents is incorporated by reference for the purposes of U.S. patent practice.

When using the supported ionic catalysts of the invention, the total catalyst system can additionally comprise one or more scavenging compounds. The term "scavenging compounds" is meant to include those compounds effective for removing polar impurities from the reaction environment. Impurities can be inadvertently introduced with any of the polymerization reaction components, particularly with solvent, monomer and catalyst feed, and adversely affect catalyst activity and stability. Impurities can result in decreased, variable or even elimination of catalytic activity. The polar impurities, or catalyst poisons include water, oxygen, metal impurities, etc. Preferably steps are taken before provision of such into the reaction vessel, for example by chemical treatment or careful separation techniques after or during the synthesis or preparation of the various components; some minor amounts of scavenging compound can still normally be used in the polymerization process itself.

Typically the scavenging compound will be an organometallic compound such as the Group 13 organometallic compounds of U.S. Pat. Nos. 5,153,157, 5,241,025 and WO-A-93/14132, WO-A-94/07927, and that of WO-A-95/07941. Exemplary compounds include triethyl aluminum, triethyl borane, triisobutyl aluminum, methylalumoxane, isobutyl aluminoxane, and tri(n-octyl)aluminum. Those scavenging compounds having bulky or $C_8$–$C_{20}$ linear hydrocarbyl substituents covalently bound to the metal or metalloid center being preferred to minimize adverse interaction with the active catalyst. The amount of scavenging agent to be used with supported transition-metal cation-noncoordinating anion pairs is minimized during polymerization reactions to that amount effective to enhance activity. A particularly unexpected benefit of the supported catalysts of the invention is the exceptionally low levels, to essentially none, of scavenger needed to neutralize impurities. The selective permeability of the polymeric beads appears to inhibit the approach of the polar impurities to the active catalysts.

Gas phase processes use supported catalysts and are conducted under gas phase or multiphase conditions suitable for ethylene homopolymers or copolymers prepared by coordination polymerization. Illustrative examples may be found in U.S. Pat. Nos. 4,543,399, 4,588,790, 5,028,670, 5,352,749, 5,382,638, 5,405,922, 5,422,999, 5,436,304, 5,453,471, and 5,463,999, and International applications WO 94/28032, WO 95/07942 and WO 96/00245. Each is incorporated by reference for purposes of U.S. patent practice. Typically the processes are conducted at temperatures of from about −100° C. to 150° C., preferably from about 40° C. to 120° C., at pressures up to about 7000 kPa, typically from about 690 kPa to 2415 kPa. Continuous processes using fluidized beds and recycle streams as the fluidizing medium are preferred.

Slurry polymerization processes in which the immobilized catalyst systems of this invention may be used are typically described as those in which the polymerization medium can be either a liquid monomer, like propylene, or a hydrocarbon solvent or diluent, advantageously aliphatic paraffin such as propane, isobutane, hexane, heptane, cyclohexane, etc. or an aromatic one such as toluene. Diluent selection may be used to control polymerization rates, through its effect on the degree and rate of swelling of the polymeric support beads of the invention. For example, toluene swells crosslinked polystyrene beads more rapidly and to a much greater degree than does isobutane. A greater degree of swelling will increase polymerization rates. The polymerization temperatures may be those considered low, e.g., less than 50° C., preferably 0° C.–30° C., or may be in a higher range, such as up to about 150° C., preferably from 50° C. up to about 80° C., or at any ranges between the end points indicated. Pressures can vary from about 100 to about 700 psia (0.76–4.8 MPa. Additional description is given in U.S. Pat. Nos. 5,274,056 and 4,182,810 and WO 94/21962 which are incorporated by reference for purposes of U.S. patent practice.

In the process manner discussed above with the invention catalysts described in this application, unsaturated monomers, that is olefinically or ethylenically unsaturated monomers, may be polymerized so as to form polymer products having molecular weights (weight-average or $M_w$) from about 500 to about $3 \times 10^6$. Most typically, the polymer products will have an $M_w$ of from about 1000 to about $1.0 \times 10^6$. Suitable unsaturated monomers will include ethylene, $C_3$–$C_{20}$ linear or branched α-olefins, $C_4$–$C_{20}$ cyclic olefins, $C_4$–$C_{20}$ non-conjugated diolefins, $C_4$–$C_{20}$ geminally disubstituted olefins, $C_8$–$C_{20}$ styrenic olefins or $C_{20-C100}$ α-olefin macromers. Preferably the polymer products will be any of polyethylene homopolymers and copolymers, particularly, polyethylene plastics, plastomers and elastomers; polypropylene homopolymers and copolymers, including atactic, syndiotactic or isotactic polypropylene; and cyclic olefin copolymers, particularly ethylene-norbornene copolymers. An additional unexpected benefit of using the invention capability resides in the selective permeability of these hydrocarbyl monomers in the polymeric bead matrix. This selective permeability allows ratios of monomer concentrations beyond what can be achieved using conventional supports such as silica. For example, hexene to ethylene feed ratios in gas phase polymerizations, which would ordinarily lead to hexene condensation under normal operating conditions, can be achieved since the hexene readily penetrates the polymeric bead and is available at the active site of polymerization without regard to condensation.

Industrial Applicability

The supported catalyst according to the invention will be useful for industrial means of preparing addition or insertion polymers derived from olefinically unsaturated monomers. In particular the invention catalysts will be particularly suitable for use in gas phase or slurry processes, such as those practiced industrially worldwide, largely in accordance with the description above of these processes. Such polymer manufacturing processes are responsible for large amounts of plastic, thermoplastic elastomers and elastomers for films, fibers, packaging, adhesive substrates and molded articles in common use. Additionally the methodology of the invention can be readily extended to exploit combinatorial methods of catalyst evaluation. The polymeric supported activators are valuable intermediates for the construction and screening of libraries useful for optimization of new single-site catalyst systems capable of activation by protonation.

EXAMPLES

General

Unfunctionalized polystyrene-co-divinylbenzene beads (1% DVB, 200–400 mesh) were supplied by Biorad Laboratories (Hercules, Calif.) and washed carefully prior to use. Cyclohexane and dioxane were distilled from sodium benzophenone ketyl prior to use. Other solvents and reagents were used as received. Abbreviations in these examples include the following: THF (tetrahydrofuran), Ph (phenyl), Me (methyl), PE (polyethylene). Unfunctionalized polystyrene beads were purified as described by Fréchet in *Journal of Organic Chemistry* 1976, 41 p. 3877.

Example 1

Preparation of Ionic Activator Bead Composition

Unfunctionalized polystyrene beads (S-X1 from Biorad Laboratories, 10.03 g) were stirred in dry air free cyclohexane (120 mL) under Ar. Tetramethylethylenediamine (TMEDA, 10.4 mL=66 mmol) was added and then the reaction mixture was heated to 60° C. A 2.6 M solution of n-butyllithium in hexane (35 mL=91 mmol) was added by syringe causing a rapid darkening of the suspension. After four hours stirring, the reaction mixture was cooled and filtered, yielding red/brownbeads. These were washed with freshly distilled dioxane until no more color was extracted (5×100 mL). They were then treated with a solution of $B(C_6F_5)_3$ (13.188 g=25.8 mmol) in dioxane (100 mL), leading to rapid loss of the dark red color, and left to stir in this solution overnight. The pale brown beads were then filtered, washed twice with dioxane, and once with dioxane/water 80/20. They were then extracted with dioxane/water and then THF in a soxhlet and dried under vacuum at 60° C. overnight. The increase in mass corresponds to a loading of 0.37 meq. boron/g. Elemental analysis. Calc.(0.37 meq/g): C, 82.58; H, 6.22; Found C, 83.34; H, 6.71. These Borated beads (10.02 g) were treated with a solution of dimethylanilinium hydrochloride (1.82 g=11.5 mmol) in degassed dichloromethane (80 mL) and stirred for 1.5 hours at room temperature under argon. They were then filtered and washed with dichloromethane (five 100 mL portions) and toluene, and dried under vacuum at 60° C. overnight. Elemental analysis: Calc. (0.37 meq.) C, 82.67; H, 6.41; N, 0.49; Found C, 83.09; H, 6.71; N, 0.54.

Example 2

Catalyst A Preparation

In an inert atmosphere glove box, 1.01 grams of the Ionic Activator Beads from Example 1 with 0.34 mmol available functional group per gram of beads (i.e., 0.34 meq) were added to a toluene solution (60 mL) of dimethylsilylbis($h^5$-2-methylindenyl) zirconium dimethyl (0.425 g, 0.975 mmol, 2.8 eq) at 25° C. under nitrogen with vigorous stirring. The reaction was stirred for 1 h, and then the supported activator was isolated by vacuum filtration and washed with four 15 mL portions of dry, oxygen free toluene. The supported catalyst was then dried overnight in vacuo, yielding 0.958 g of finished catalyst (some material loss due to transfer), with a calculated loading of 0.30 mmol of active transition metal per gram of finished catalyst.

Example 3

Catalyst B Preparation

Catalyst B was prepared in analogous manner to Catalyst A, but 0.815 grams of the Ionic Activator Beads from Example 1 with 0.34 mmol available functional group per gram of beads (i.e., 0.34 meq) was reacted with cyclopentadienyl(pentamethylcyclopentadienyl) zirconium dimethyl (0.132 g, 0.412 mmol, 1.5 eq), yielding 0.792 g of finished catalyst (some material loss due to transfer), with a calculated loading of 0.31 mmol of active transition metal per gram of finished catalyst.

Example 4

Catalyst C Preparation

Catalyst C was prepared in analogous manner to Catalyst A, but 1.04 grams of the Ionic Activator Beads from Example 1 with 0.34 mmol available functional group per gram of beads (i.e., 0.34 meq) was reacted with dimethylsilylbis($u^5$-2-methylindenyl) zirconium dimethyl (0.223 g, 0.512 mmol, 1.5 eq) yielding 0.1.08 g of finished catalyst (some material loss due to transfer), with a calculated loading of 0.30 mmol of active transition metal per gram of finished catalyst.

Example 5

Slurry-Phase Ethylene-Hexene Polymerization with Catalyst A

Polymerization was performed in the slurry-phase in a 1-liter autoclave reactor equipped with a mechanical stirrer, an external water jacket for temperature control, a septum inlet and a regulated supply of dry nitrogen and ethylene. The reactor was dried and degassed thoroughly at 115° C. Hexane (400 cc) was added as a diluent, 0.4 cc of a 1.25 M triisobutyl aluminum solution in pentane was added as a scavenger, using a gas tight syringe, and 45 mL of hexene via cannula. The reactor was charged with 75 psig (5.17 bar) of ethylene at 40° C. A 10 cc stainless steel bomb was charged with 0.100 g of Catalyst A (bomb loaded in inert atmosphere glove box) and affixed to the reactor with a swagelock fitting. The catalyst was then introduced into the reactor. The polymerization was continued for 30 minutes while maintaining the reaction vessel within 3° C. of 40° C. and 75 psig ethylene pressure (5.17 bar) by constant ethylene flow. The reaction was stopped by rapid cooling and venting. 41.9 grams of ethylene-hexene copolymer were recovered. The polyethylene had a weight average molecular weight of 77,900, a molecular weight distribution of 1.4, and contained 7.5% hexene by weight. Bulk polymerization activity was calculated by dividing the yield of polymer by the total weight of the catalyst charge by the time in hours and by the absolute monomer pressure in atmospheres to yield a value of 164 g PE/g catalyst-h-atm. The specific polymerization activity was calculated by dividing the yield of polymer by the total number of millimoles of transition metal contained in the catalyst charge by the time in hours and by the absolute monomer pressure in atmospheres, yielding a value of 552 g PE/mmol catalyst-h-atm.

Example 6

Slurry-Phase Ethylene-Hexene Polymerization with Catalyst B

Polymerization was performed as described in Example 5 but using Catalyst B and with the following process modifications: Temperature was maintained at 60° C., ethylene pressure at 150 psig (10.34 bar), and 0.200 g of catalyst was used. The polymerization was run for 1 hour. The reaction was stopped by rapid cooling and venting. 97.8 grams of ethylene-hexene copolymer was recovered. Since the ethylene/hexene ratio changed appreciably over the course of the run (28% of the hexene was consumed) no effort was made to obtain GPC data. The polyethylene contained 7.5.2% hexene by weight. Bulk polymerization activity was calculated by dividing the yield of polymer by the total weight of the catalyst charge by the time in hours and by the absolute monomer pressure in atmospheres to yield a value of 96 g PE/g catalyst-h-atm. The specific polymerization activity was calculated by dividing the yield of polymer by the total number of millimoles of transition metal contained in the catalyst charge by the time in hours and by the absolute monomer pressure in atmospheres, yielding a value of 311 g PE/mmol catalyst-h-atm.

Example 7

Bulk-Phase Propylene Polymerization using Catalyst C

Polymerization was performed in the slurry-phase in a 1-liter autoclave reactor equipped with a mechanical stirrer, an external waterjacket for temperature control, a septum inlet and a regulated supply of dry nitrogen and propylene. The reactor was dried and degassed thoroughly at 115° C. Propylene (500 mL) was added along with 0.6 mL of a 1.25 M triisobutyl aluminum solution in pentane as a scavenger, using a gas tight syringe. The reactor was heated to 40° C., at which point the catalyst was added (dry) using nitrogen pressure. The temperature was immediately brought to 70° C. and maintained within 3° C. of that temperature for 16 minutes. The reaction was stopped by rapid cooling and venting. 133.4 grams of isotactic polypropylene was recovered, which had a weight average molecular weight of 101,000 daltons, and a molecular weight distribution of 1.9. Bulk polymerization activity was calculated by dividing the yield of polymer by the total weight of the catalyst charge by the time in hours to yield a value of 5000 g PP/g catalyst-h. This example demonstrates the use of a chiral bridged metallocene to prepare isotactic polypropylene (i-PP).

Additionally, the narrow molecular weight distribution attests to the single sited nature of these catalysts.

In all these polymerization examples, the majority of the product (all product isolated as beads in Examples 6 & 7, some fouling evident in Example 5) was isolated in the form of discrete free flowing spherical beads of high bulk density (>0.35 g/cc), with a similar distribution of sizes to that of the starting polystyrene beads. This suggests that each polymer bead was the result of polymerization from an individual catalytic bead, with essentially no particle fracture. Analysis of ethylene uptake data indicates shows a controlled increase in uptake rate for the first ca. 15 min of the polymerization, and this rate was essentially maintained for at least an hour thereafter.

This application is related to copending U.S. application Ser. No. 09/092,752 filed Jun. 5, 1998, and published as WO 98/55518. All teachings as to the polymeric beads of this application (surface area, emulsion polymerizable monomers and selection of slurry solvent for swelling, etc.) are applicable in that application as adapted to the method of anion attachment therein.

We claim:

1. A supported olefin polymerization cocatalyst activator composition comprising a cross-linked polymer bead having a surface area of from about 1 to 20 $m^2/g$ to which are bound a plurality of noncoordinating anions, where the polymeric support comprises ligands covalently bound to the central metal or metalloid atoms of said anions, and an effective number of cationic species to achieve a balanced charge.

2. The activator composition of claim 1 represented by the formula:

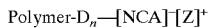

Polymer-$D_n$—[NCA]⁻[Z]⁺ where Polymer is a cross-linked polymeric backbone, D is an optional group linking the Polymer to NCA, n is 0 or 1, NCA is a compatible noncoordinating anion derived from a Lewis acid moiety and Z is a suitable cation that electronically charge balances NCA.

3. An olefin polymerization catalyst composition comprising the reaction product of a) the cocatalyst activator composition of claim 1, and b) an organometallic transition metal compound having ancillary ligands, at least one labile ligand capable of abstraction by protonation and at least one labile ligand into which an olefinic monomer can insert for polymerization.

4. The catalyst composition of claim 3 wherein said organometallic transition metal compound is a monocyclopentadienyl ligand-containing Group 4 metal compound.

5. The catalyst composition of claim 3 wherein said organometallic transition metal compound is a biscyclopentadienyl ligand-containing Group 4 metal compound.

6. The catalyst composition of claim 3 wherein said organometallic transition metal compound is a Group 4–10 metal compound other than a monocyclopentadienyl or biscyclopentadienyl ligand-containing Group 4 metal compound.

7. The catalyst composition of claim 3 wherein said noncoordinating anion is one derived from a halogenated trisaryl boron or aluminum compound.

8. The catalyst composition of claim 3 wherein said organometallic transition metal compound has a high activity level for olefin polymerization and said polymer bead has a surface area of $\leq 10$ $m^2/g$.

* * * * *